United States Patent [19]

Basteck

[11] Patent Number: 5,718,542
[45] Date of Patent: Feb. 17, 1998

[54] CUTTER PLATE FOR A SINGLE CUTTER REAMER AND PROCESS FOR REAMING BORES WITH SUCH A CUTTER PLATE

[76] Inventor: Andreas Basteck, Oberer Schlossberg 6, D-71686 Remseck, Germany

[21] Appl. No.: 432,949

[22] Filed: May 1, 1995

[30] Foreign Application Priority Data

Apr. 29, 1994 [DE] Germany .............. 44 15 018.0

[51] Int. Cl.⁶ .................................................. B23B 51/00
[52] U.S. Cl. ...................... 408/1 R; 408/199; 408/224; 408/713
[58] Field of Search ........................ 408/223, 224, 408/199, 227, 231–233, 713, 1 R

[56] References Cited

U.S. PATENT DOCUMENTS

| 466,869 | 1/1892 | Gerdom ................... 408/233 |
| 481,300 | 8/1892 | Gerdom ................... 408/224 |
| 4,792,264 | 12/1988 | Kress et al. ............. 408/199 |
| 5,474,406 | 12/1995 | Kress et al. ............. 408/713 |

*Primary Examiner*—Steven C. Bishop

[57] ABSTRACT

Reamers, when operated with large amounts of material removed and at high reaming speeds, encounter difficulties when they ream in material in which permanent structural changes occur on the application of heat and subsequent rapid cooling. These difficulties are avoided in that the transition region between the main cutting edge and the minor cutting edge follows a constantly curved path at least one end region of which runs tangentially to at least the minor cutting edge.

23 Claims, 7 Drawing Sheets

CUTTER PLATE FOR A SINGLE CUTTER REAMER AND PROCESS FOR REAMING BORES WITH SUCH A CUTTER PLATE

BACKGROUND OF THE INVENTION

Field of the Invention

The invention relates to a cutter plate having a chip cutting surface having main and minor cutting edges and a transition region therebetween. The invention also relates to a process for reaming using such a cutter plate.

High dimensional accuracy is desired when reaming bores.

However, cost-effective operation is also simultaneously desired. This is achieved, inter alia, by high cutting speeds. High cutting speeds mean that in the goods to be processed, the material to be reamed becomes hot. The material is however cooled down again very quickly by coolant or the like. If steel is concerned, the temperature can rise to above 800° C., and in aluminum to over 300° C. If these materials are then rapidly cooled, permanent structural changes then arise, and in fact in the direction of considerably greater hardness. The main cutting edge now always cuts in just those regions which it has previously hardened.

The chip in front of the main cutting edge now causes less difficulty than the chip region which arises at the transition from the main cutting edge to the minor cutting edge, since that chip region in fact becomes nearly infinitesimally thin, because the minor cutting edge deviates only by a few degrees there from parallelism with the geometrical rotation axis. To cut off the thin tip, which has just been previously hardened during the rotary motion, is then difficult or even impossible.

The Inventor discovered the abovementioned relationships.

SUMMARY OF THE INVENTION

The object of the invention is to provide a cutting plate that avoids the above mentioned disadvantage.

To solve the problem, the transition region according to the present invention follows a constantly curved path with an end region that is tangential with an extension of the minor cutting edge.

It has been discovered that thereby no structural changes occur which lead to permanent hardening, and no places arise at which the chip must avoidably break.

The temperatures which lead to hardening are 800°–1, 200° C. for steel, and above 300° C. for aluminum.

DESCRIPTION OF THE DRAWINGS

The invention will now be described with reference to the state of the art and to preferred embodiments, taken together with drawings, in which.

DETAILED DESCRIPTION PREFERRED EMBODIMENTS

Figure 1:
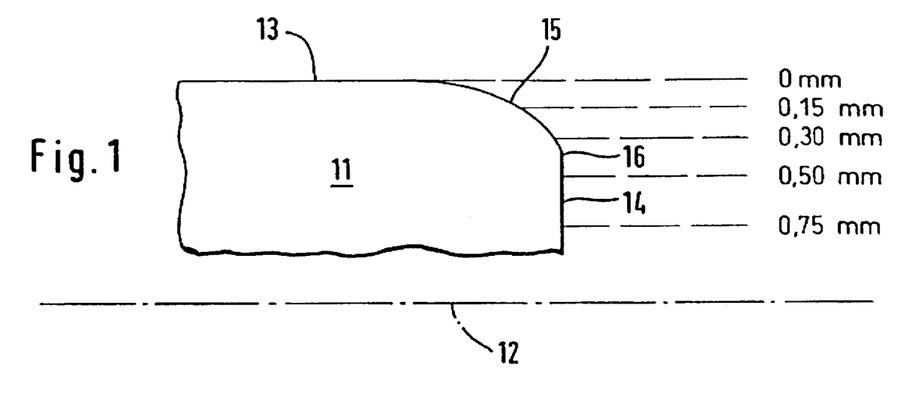
FIG. 1 shows a plan view of a corner region of a cutter plate.

According to FIG. 1, a cutter plate 11 (which is broken away to the left) is rotatable around a geometrical longitudinal axis 12. It has a minor cutting edge 13, which runs nearly parallel to the geometrical longitudinal axis 12, and a main cutting edge 14, which is arranged substantially perpendicular to this geometrical longitudinal axis. The main cutting edge is normally substantially shorter than the minor cutting edge 13, but is so named because it cuts off the most important amount of chips. The outward facing region of the minor cutting edge 13 removes practically no material from the bore wall and is hence called the minor cutting edge, although the minor cutting edge region is determinative of the quality of the bore wall, since it serves to support the reamer and to smooth the bore wall.

It cannot be said that the minor cutting edge ends at a given point and the main cutting edge ends at a given point; rather, a transition region is present there. According to FIG. 1, this transition region 15 follows a logarithmic curve. Its precise construction can be seen from FIG. 9, and likewise the function of logarithms to the base 10 is stated. As can be seen, the tangent is about 1 degree at a distance of 0.3 mm from the beginning of the logarithmic curve.

Figure 2:
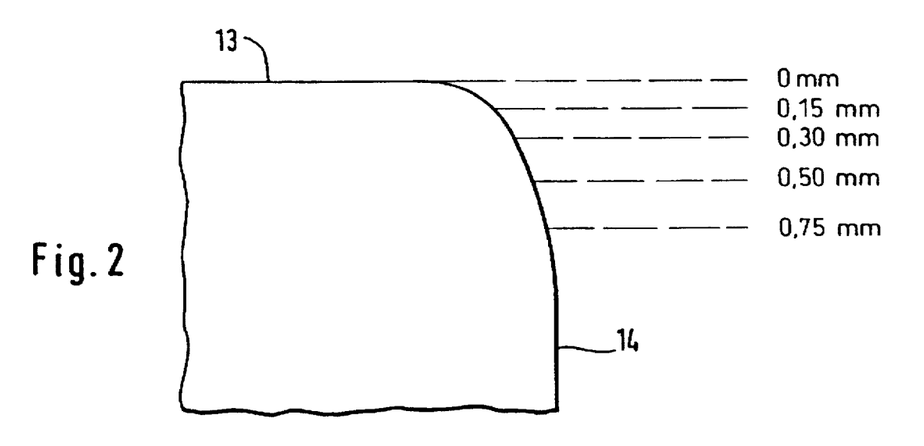
FIG. 2 shows a view like FIG. 1, but with a corner region of a different shape.

In FIG. 2, the transition region has the shape of a curve of natural logarithms, starts tangentially from the minor cutting edge 13, and merges tangentially into the main cutting edge 14, while in fact a distinct corner 16 is present here in the cutter plate according to FIG. 1.

Figure 3:
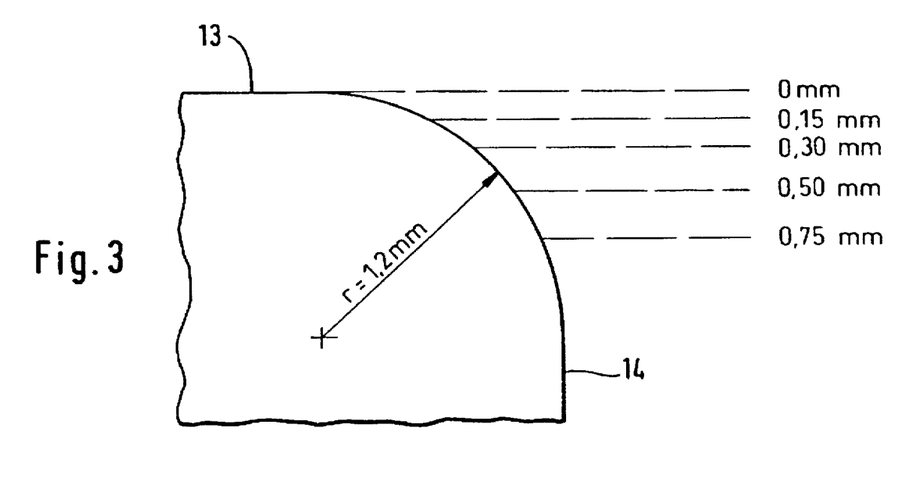
FIG. 3 shows a view like FIG. 1, but for a third embodiment example, to the scale of FIGS. 1–3.

In the embodiment example according to FIG. 3, the transition region has the shape of a radius of r=1.2 mm, likewise with a tangential transition from the minor cutting edge and from the main cutting edge.

Were the bore wall to lie on the 0 mm line, no chip would be removed.

At an imaginary 0.1 mm line, substantially the minor cutting edge, together with a portion of the transition region, would cut. Large amounts of bore removed begin at about 0.15 mm and extend to at most 0.5 mm, since to take off a removed amount of 0.5 mm, it would mean boring out, not reaming with a large amount removed.

Figure 4:
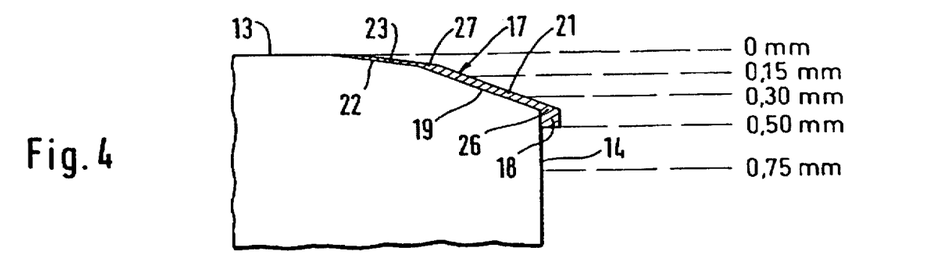
FIG. 4 shows a plan view of the corner region of a known cutter plate with a chip forming region.

According to FIG. 4, a known cutter plate removes a chip 17 with each rotation; the chip is very thick in the partial region 18. The partial region 21 becomes thinner because of the first bevel 19, but is of equal thickness overall, like the partial region 18. Because of the still more acute angled bevel 22, the partial region 23 of the chip is extremely thin.

Figure 5:
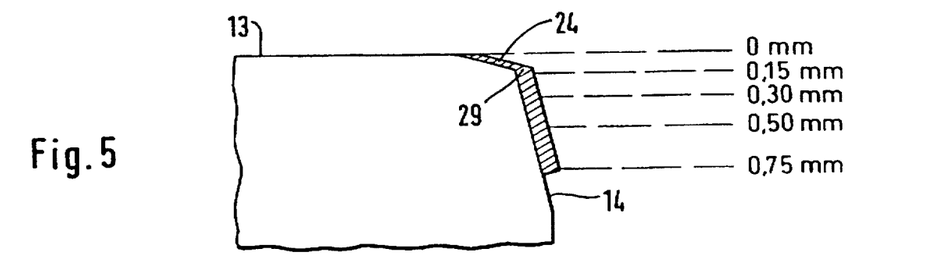
FIG. 5 shows a view like FIG. 4 of the corner region, including the chip forming region, of a second known cutter plate.
Figure 6:
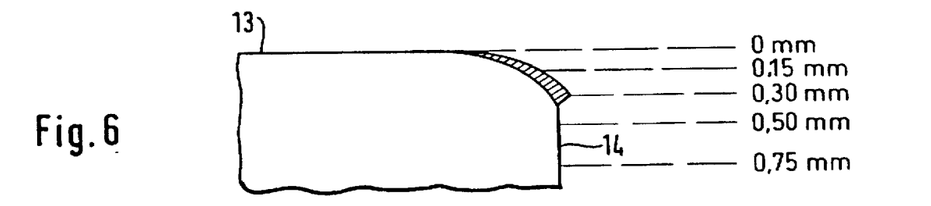
FIG. 6 shows a view like FIG. 1, but with a chip forming region.
Figure 7:
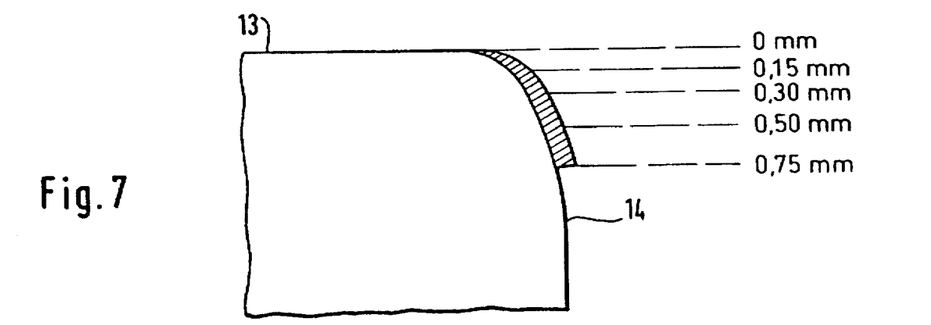
FIG. 7 shows a view like FIG. 2, but with a chip forming region.
Figure 8:
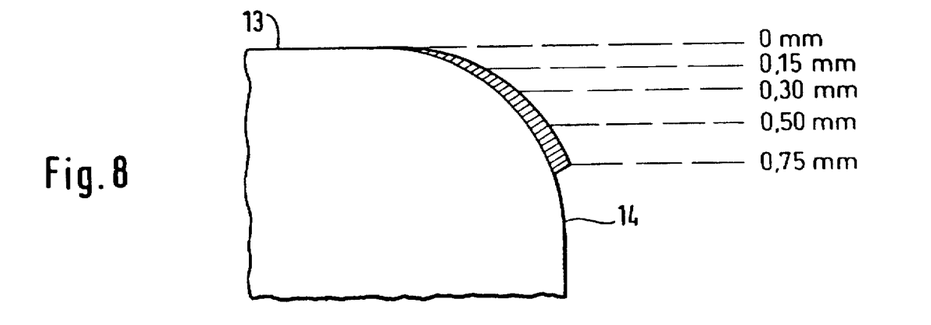
FIG. 8 shows a view like FIG. 3, but with a chip forming region.

A somewhat different geometry is seen in FIG. 5. Since the whole outwardly positioned bevel is not so acute angled, the outermost partial region 24 is thicker than the partial region 23 of the cutter plate according to FIG. 4.

It is common in the state of the art for predetermined breaking points 26, 27 and 29 to be provided here, between the partial regions. With the cutter plate according to FIG. 4, this means that statistically either permanently, or in any case much too frequently, the partial region 23 parts from the partial region 21 to the extent that the two break at the predetermined breaking point 26.

The partial region 23 can however very frequently remain hanging on the bore wall, and a high, downward-directed (directed towards the geometrical longitudinal axis 12) passive force arises. Or else the chip thickness is so small that no chip can be removed.

In the embodiment examples according to the invention, it is naturally the case that the tips of the chip, which are also present there, are very thin at the ends. The great difference consists, however, in that each volume element increases infinitesimally in its cross section towards the main cutting edge; that is, that no predetermined breaking points are present, and each larger volume element becomes only a little thinner towards the smaller volume element and can entrain this during cutting.

Figure 9:
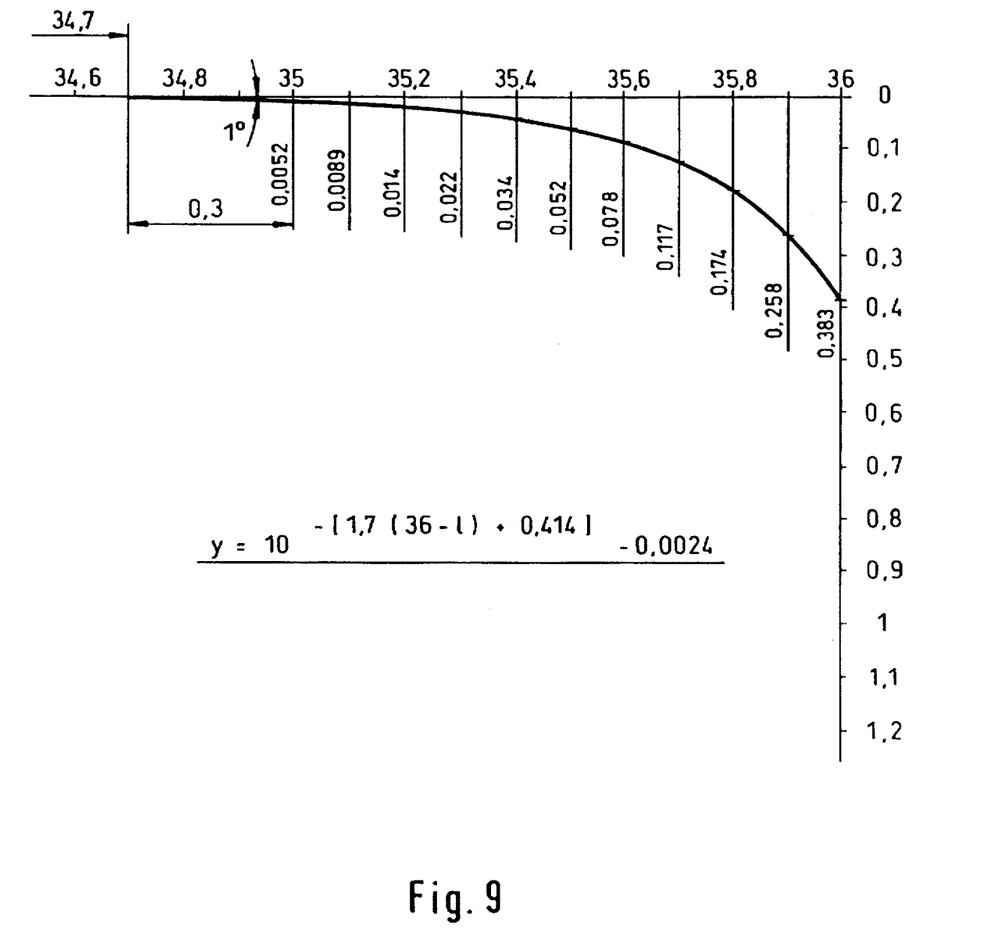
FIG. 9 shows a more exact representation, which is also according to a formula, of the transition region.

The cutter plate according to FIG. 9 is 36 mm long. It thus ends at the right. The measurements to the left from the numeral "36" give the location parallel to the axis, and the numerals written perpendicularly give the distance at this location to the straight line drawn above them. The curve begins with one degree of inclination.

The upper, horizontal, straight line can also be considered as the imaginary bore wall.

Figure 10:
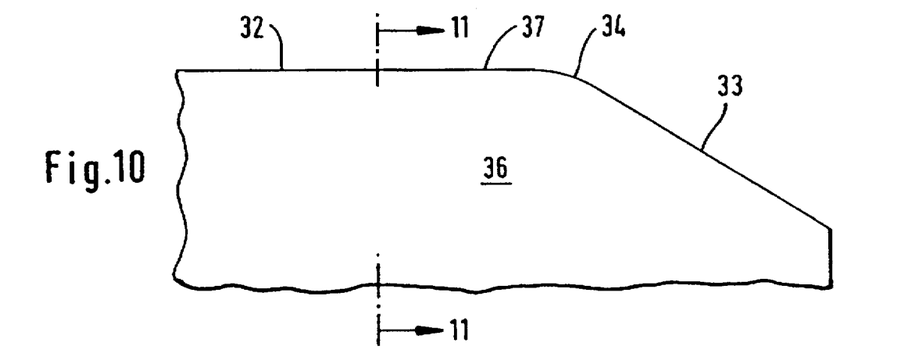
FIG. 10 shows a view similar to FIG. 1, of a cutter plate of a particularly preferred shape.

In the embodiment example according to FIG. 10, there are a minor cutting edge 32 and a main cutting edge 33, which has a substantially straight portion. The two are connected together by a radius 34. The circular arc thus extends here over a substantially smaller angle than 90°, e.g., 30°. The radius is 1.2 mm.

Figure 11:
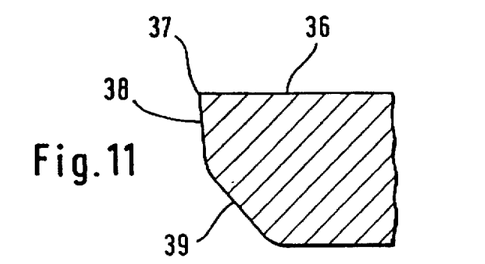
FIG. 11 shows a section along the line 11,11 in FIG. 10.

There can be seen in FIG. 11 the upper side 36 of the cutter plate, the cutting edge 37, a surface 38 with which the minor cutting edge abuts, is supported on, and smooths the bore wall, and also a bevel 39 as a free surface.

Figure 12:
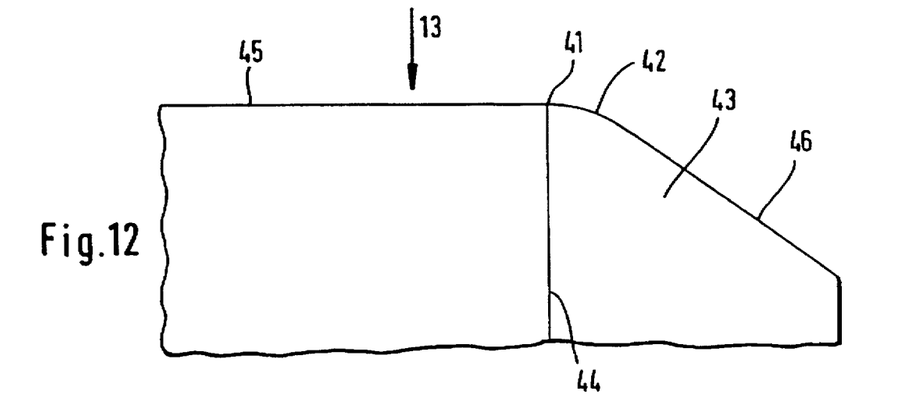
FIG. 12 shows a view like FIG. 10, of a further modified embodiment example.
Figure 13:
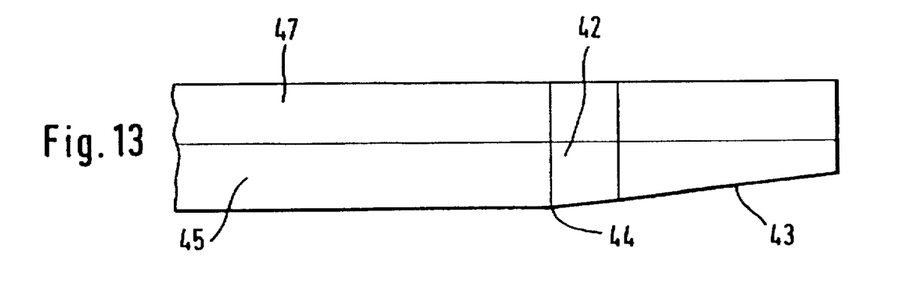
FIG. 13 shows a view in the direction of the arrow in FIG. 12.

In the embodiment example according to FIGS. 12 and 13, the upper side of the cutter plate is provided from the beginning 41 of the radius 42 with a flattening 43 which merges with a bend 44 at an angle of 15° into the otherwise flat upper side. There can also be discerned here the surface 46, which abuts the bore during machining, and which extends via the radius 42 as far as the main cutting edge 45. A flattening 43 of this kind leads to a considerably better chip removal. The bevel 47 can also be discerned; this does not abut the bore, and likewise extends fully to the right. Modern grinding machines make possible this kind of machining.

Figure 14:
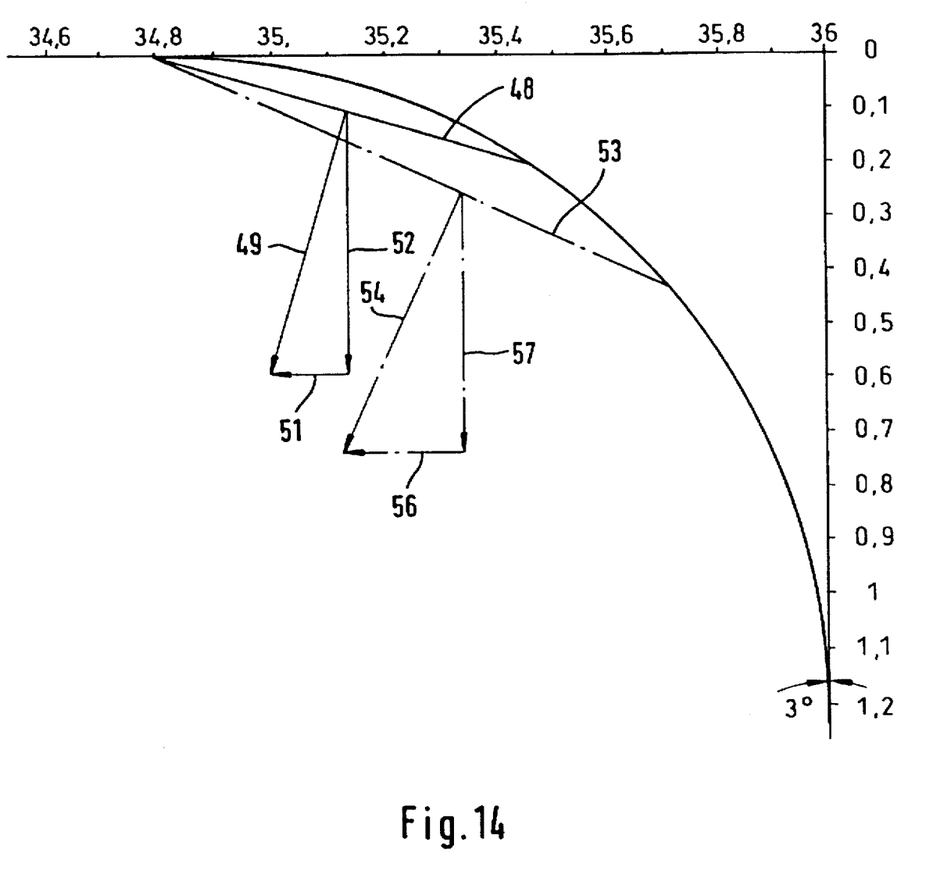
FIG. 14 shows a view similar to FIG. 3, but in more detail, and also with an illustration of the direction of the passive force when different amounts are removed.

In the representation according to FIG. 14 it was assumed in the first place that an amount of 0.2 mm would be removed by reaming. The straight line 48 correspondingly begins at 34.8 mm (bore wall) and ends at the height of about 0.2 mm removed. The chip removed at this region causes a total force 49 which is perpendicular to the straight line 48. This can be resolved into a thrust force 51 by which the reamer is moved into the bore, and a passive force 52 which is perpendicular to this.

The dot-dash line 53 likewise begins at the bore wall at 34.8 mm, and ends at an amount removed of about 0.45 mm. It obviously runs flatter. More chip is now removed, resulting in a total force 54 which is greater than the total force 49. The thrust force 56 is also greater than the thrust force 51. However, the passive force 57 is about equal to the passive force 52, so that there are approximately constant relationships, substantially independent of the magnitude of the removed chip.

Figure 15:
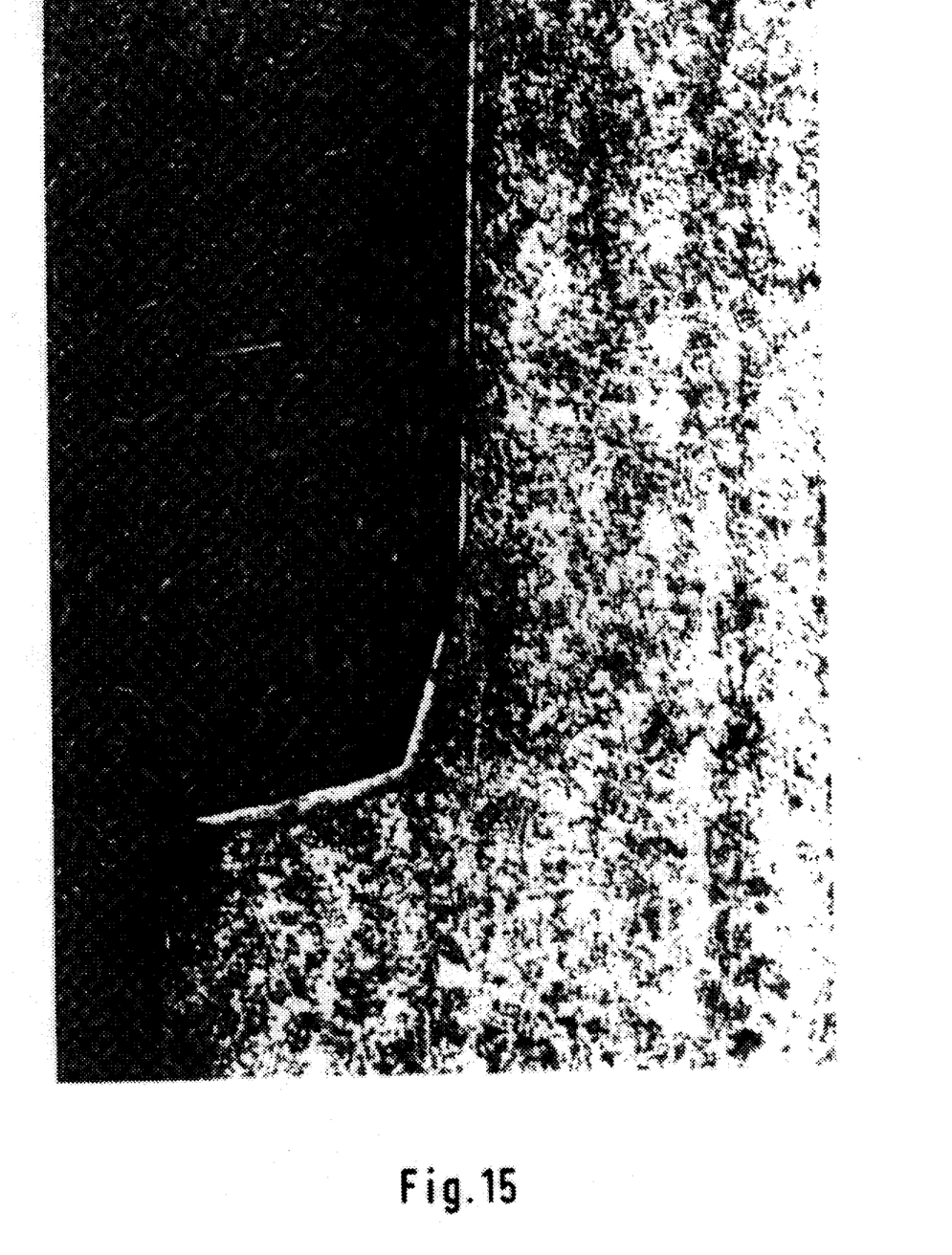
FIG. 15 shows a scanning electron microscope image through the lower partial region of a bore which was reamed with a conventional tool and which shows a hardened layer.

The photograph 15 shows a reamed bore wall in the lower region, which was reamed by a cutter plate similar to that of FIG. 5. The white border of the essentially black bore hole shows a thin, hardened layer. In FIG. 15, the middle axis of the bore lies to the left of the photograph.

Figure 16:
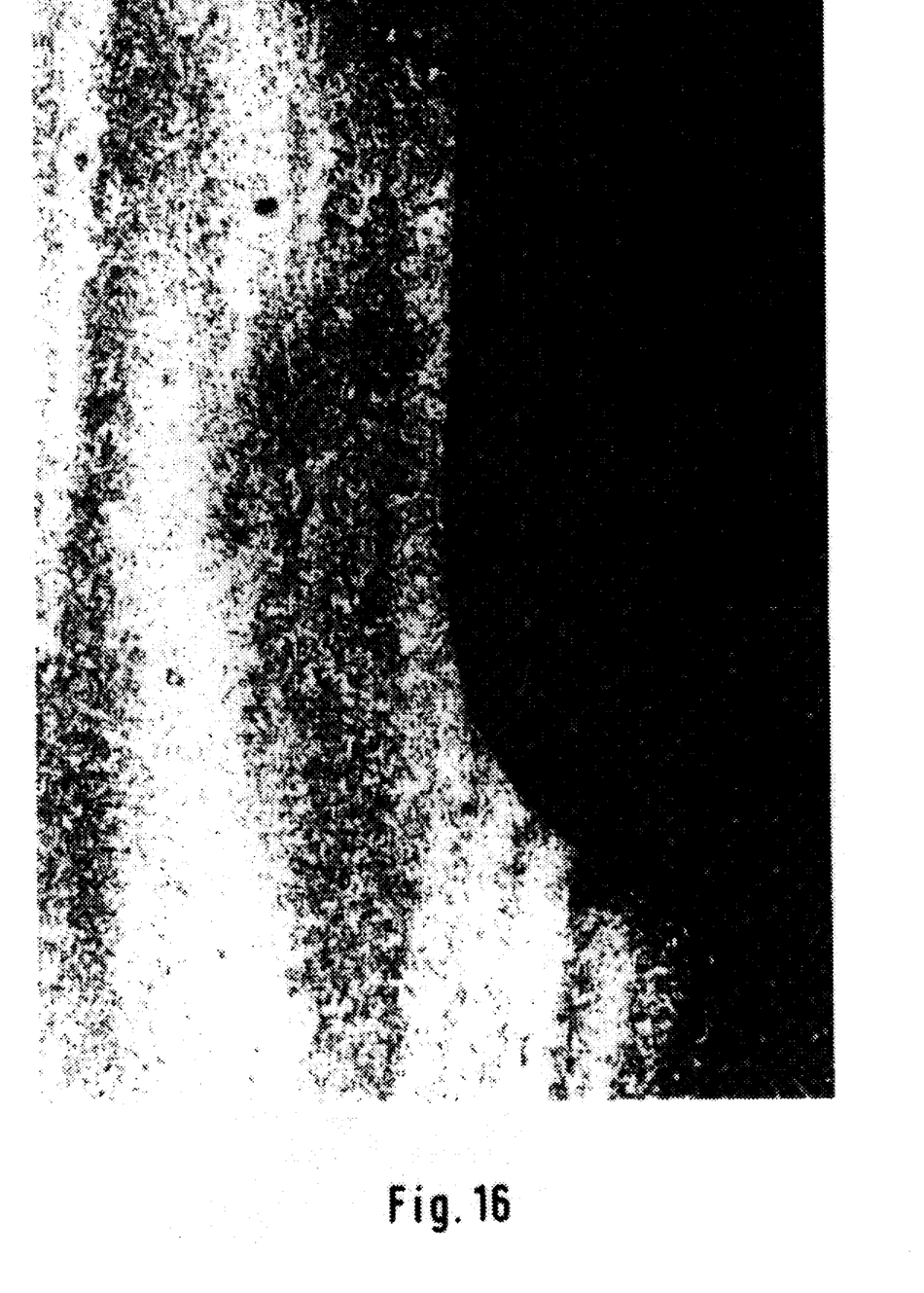
FIG. 16 shows an image like FIG. 15, but with reaming according to the invention.

In FIG. 16, the bore axis lies to the right of the photograph. Reaming was performed here with a cutter plate according to FIGS. 10 and 11. It is striking that no hardening zone at all is shown here, and therefore in this respect better working results are obtained.

The invention can be applied in the case of the application of a single cutter reamer and also to conventional multi-cutter reamers.

I claim:

1. A cutter plate for a single cutter reamer, having a chip cutting surface comprising
   a main cutting edge,
   a minor cutting edge, and
   a transition region between said main and minor cutting edges, wherein said transition region in a plan view of said chip cutting surface follows a constantly curved path with an end region that runs tangentially at least with an extension of said minor cutting edge.

2. Cutter plate according to claim 1, wherein said main cutting edge comprises an at least substantially straight portion, and said constantly curved path connects said minor cutting edge tangentially with said substantially straight portion.

3. Cutter plate according to claim 1, wherein said constantly curved path follows a function of a conical section.

4. Cutter plate according to claim 3, wherein said constantly curved path is in a form of a radius.

5. Cutter plate according to claim 3, wherein said constantly curved path is in a form of a portion of a hyperbola.

6. Cutter plate according to claim 3, wherein said constantly curved path is in a form of a portion of a parabola.

7. Cutter plate according to claim 1, wherein said constantly curved path is in a form of a logarithmic curve.

8. Cutter plate according to claim 7, wherein said constantly curved path is in the form of a portion of a curve of natural logarithms.

9. Cutter plate according to claim 1, wherein said constantly curved path has a second end region that runs tangentially to said main cutting edge.

10. Cutter plate according to claim 1, wherein said chip cutting surface has no chip guiding step.

11. Cutter plate according to claim 1, wherein said chip cutting surface further comprises a flat bevel, at least in a region of said main cutting edge.

12. Cutter plate according to claim 11, wherein said flat bevel is inclined at 15°±30%.

13. Cutter plate according to claim 11, wherein said flat bevel begins at least substantially at a beginning of said end region of said constantly curved path.

14. Process for the reaming of bores with a large amount of material removed and high cutting speeds in materials that can be hardened by heat comprising:

employing a cutter plate of a single cutter reamer that has a main cutting edge and a minor cutting edge, and a transition region between said main cutting edge and said minor cutting edge that follows a constantly curved path with an end region that is tangential at least to an extension of said minor cutting edge.

15. Process according to claim 14, further comprising removing from about 0.15 mm of material from said bore.

16. Process according to claim 15, comprising removing at least 0.2 mm of material from said bore.

17. Process according to claim 15, comprising removing between 0.15 mm and 5 mm of material from said bore.

18. Process according to claim 14, further comprising removing with cutting speeds higher than 80 m/min.

19. Process according to claim 18, comprising removing material with cutting speeds higher than 100 m/min.

20. Process according to claim 18, comprising removing material with cutting speeds between 80 m/min and 300 m/min.

21. Process according to claim 14, wherein said material is a hardenable alloy.

22. Process according to claim 14, wherein said material is an aluminum alloy.

23. Process according to claim 14, wherein said material is steel.

\* \* \* \* \*